United States Patent [19]

Barron et al.

[11] Patent Number: 5,385,013
[45] Date of Patent: Jan. 31, 1995

[54] AIRCRAFT GAS TURBINE ENGINE BACKBONE DEFLECTION THERMAL CONTROL

[75] Inventors: Michael L. Barron, Loveland; James W. Brantley, Fairfield, both of Ohio; Thomas G. Wakeman, Lawrenceburg, Ind.

[73] Assignee: General Electric Company, Cincinnati, Ohio

[21] Appl. No.: 159,917

[22] Filed: Nov. 30, 1993

Related U.S. Application Data

[63] Continuation of Ser. No. 25,452, Mar. 3, 1993, abandoned.

[51] Int. Cl.⁶ ............................................. F02G 3/00
[52] U.S. Cl. ............................. 60/39.02; 60/39.31; 60/37.75; 415/116
[58] Field of Search ............... 60/39.02, 39.31, 39.32, 60/39.75; 244/53 R, 54; 415/116

[56] References Cited

U.S. PATENT DOCUMENTS

| | | | |
|---|---|---|---|
| 4,022,018 | 5/1977 | Tuten et al. | 60/200 R |
| 4,260,741 | 5/1981 | Murphy | 244/54 |
| 4,428,189 | 1/1984 | Greenberg et al. | 60/226.1 |
| 4,471,609 | 9/1984 | Porter et al. | 60/39.31 |
| 4,603,821 | 8/1986 | White | 244/54 |
| 5,123,241 | 6/1992 | Lotan | 60/39.75 |

OTHER PUBLICATIONS

I. E. Treager, "Aircraft Turbine Engine Technology", 1979, pp. i, ii, 493–499.

Primary Examiner—Richard A. Bertsch
Assistant Examiner—Michael I. Kocharov
Attorney, Agent, or Firm—Jerome C. Squillaro; John R. Rafter

[57] ABSTRACT

A gas turbine engine thermal backbone deflection control apparatus to counter the effects of backbone bending due to nacelle aerodynamic, thrust, and maneuver loads by introducing a controlled backbone counter-bending moment by applying an uneven temperature or thermal field around the backbone to induce controlled compression and/or tensioning forces in the backbone or casing between axially spaced apart frames connected by the backbone. One embodiment of the invention provides for flowing thermal control air along an axially and circumferentially sector of the engine casing. The thermal backbone deflection control apparatus is controlled by the engines digital electronic control system using input signals generated by engine thrust load, inlet moment load sensors and/or blade tip clearance sensors.

14 Claims, 4 Drawing Sheets

AIRCRAFT GAS TURBINE ENGINE BACKBONE DEFLECTION THERMAL CONTROL

This application is a continuation of application Ser. No. 08/025,452, filed Mar. 3, 1993, now abandoned.

BACKGROUND OF THE INVENTION

1. Field of the Invention

This invention relates to a gas turbine engine apparatus for counter-acting engine case deflection due to nacelle aerodynamic and thrust loads and particularly by employing thermally control means for controlling the engine backbone bending.

The concepts were developed specifically for high bypass ratio, ducted fan engines, but have broader applicability to low bypass ratio and turbojet engines as well.

This invention is related to another invention disclosed in a related patent application Ser. No. 07/985,776 entitled "AIRCRAFT GAS TURBINE ENGINE BACKBONE DEFLECTION CONTROL" by James William Brantley, one of the present inventors, filed Dec. 4, 1992 and assigned to the same assignee.

2. Description of Related Art

A principal type of modern aircraft gas turbine engines in usage today are of the turbofan type. A portion of the working medium gases is directed from the engine inlet through the compression, combustion and turbine sections of the engine core. The remaining portion of the working medium gases is directed through the fan section, around the engine core, and discharged directly to the atmosphere to produce thrust. The diameter of the engine at the fan stages is typically significantly larger than the core engine diameter. This ratio may be on the order of two to one and larger for high bypass ratio engines of the eighty thousand pound thrust class, for example.

Each engine is supported by an aircraft structure, for example, on a pylon extending downwardly beneath the wing. The engine is typically mounted and secured to the aircraft in two planes normal to the engine centerline, one towards the forward end of the engine, usually just rearward of the fan section and a second toward the aft end of the engine, typically in the turbine section. The engine is mounted by its engine frame, a static structure which supports the rotating components, generally referred to as rotors. The engine frame generally has sub-structures including a forward frame and an aft frame connected by an engine casing often referred to as a backbone. Forward and aft frames having radially extending structural struts, which typically support the engine bearings, which in turn rotatably support the rotors. Typically, a dual rotor engine has a forward fan frame and a rear turbine frame that support the main rotor bearings, wherein the fan frame supports a thrust bearing and the rear turbine frame supports a roller bearing.

Maintaining the engine backbone concentrically about the engine rotor is of obvious criticality and a constant objective of gas turbine scientists and engineers. Prior art generally disclose case stiffening methods to reinforce the engine frame. Among the ideas disclosed in the prior art is using the annular cowl structure to reinforce or generally add support to the engine backbone. Many of these ideas add weight and cost to the engine and are not very effective when used with today's low weight metallic or composite cowls. Furthermore, the prior art designs are not capable or have limited capability to respond to varying flight conditions which cause correspondingly varying degrees of backbone deflection.

Backbone deflection due to typical axial and vertical loads is additive because both loads cause a deflected shape wherein the engine casing or backbone structure between the forward and aft mounts is deflected downward relative to the undisturbed engine centerline. High engine power during aircraft takeoff and climb can cause predictable yet varying backbone deflection due to engine thrust and nacelle aerodynamic loading.

As the nacelle size and corresponding aerodynamic loading and thrust load developed by modern turbofan engines has increased, so has the magnitude of the reaction loads and bending moment. The resultant engine static structure deflection causes increased rubbing between the rotating hardware and the adjacent stationary hardware. This abrasive wear results in an adverse impact on engine performance and specific fuel consumption, and necessitates more frequent engine maintenance and overhaul. Repair and replacement of rotor blades is one of the highest operating costs for an aircraft gas turbine engine.

Increasing fuel costs and demands for improved durability accentuate the need for low weight designs and systems for minimizing backbone deflection from the engine centerline axis under varying engine operating conditions.

SUMMARY OFT HE INVENTION

According to the present invention the backbone deflection of an aircraft gas turbine engine due to the effect of nacelle aerodynamic and thrust loads and the resultant backbone bending-moment is reduced or eliminated by introducing a thermally controlled backbone counter-bending moment by applying an uneven temperature or thermal field around the backbone to induce controlled compression and/or tensioning forces in the backbone or casing between axially spaced apart frames connected by the backbone. The uneven temperature field provides a means for thermally shrinking or expanding an axially and circumferentially extending sector of the casing between the frames to provide tensioning and compressive forces which provides a resultant controlled backbone counter-bending moment.

According to one embodiment of the invention for a high bypass turbofan engine, the controlled backbone counter-bending moment is produced by a thermal airflow means to apply an uneven temperature field around the backbone, preferably with a circumferential and/or axial gradient. Two more particular embodiments include a thermal airflow means to blow thermal control air on the outside of the engine casing or between an inner and outer casing which provide static structure for the backbone. The thermal control air is preferably flowed axially in the aft direction of the engine.

Actuation and cooling airflow modulation control for the thermal airflow means is preferably provided by a control means such as an engine control preferably a digital electronic control such as a FADEC (full authority digital electronic control) using input signals generated by inlet moment load sensors, engine thrust load sensors, and/or blade tip clearance sensors as control parameters.

ADVANTAGES

A principal advantage of the present invention is the ability to control concentricity of the engine case about the engine axis over a broad range of operating conditions that tend to bend the engine backbone. Engine case deflection as a result of nacelle aerodynamic and thrust loads may be reduced or eliminated over a broad and varying flight condition and mission. This increases fuel economy and engine component durability due to greatly reduced case deflection all along the length of the engine.

The foregoing and other features and advantages of the present invention, will become more apparent in the light of the following description and accompanying drawing.

BRIEF DESCRIPTION OF THE DRAWINGS

The foregoing aspects and other features of the invention are explained in the following description, taken in connection with the accompanying drawings where:

FIG. 3A is a schematic sectional view taken through section 3A—3A in FIG. 3 illustrating the distribution tube impinging thermal control air on the compressor casing.

DETAILED DESCRIPTION OF THE INVENTION

Figure 1:
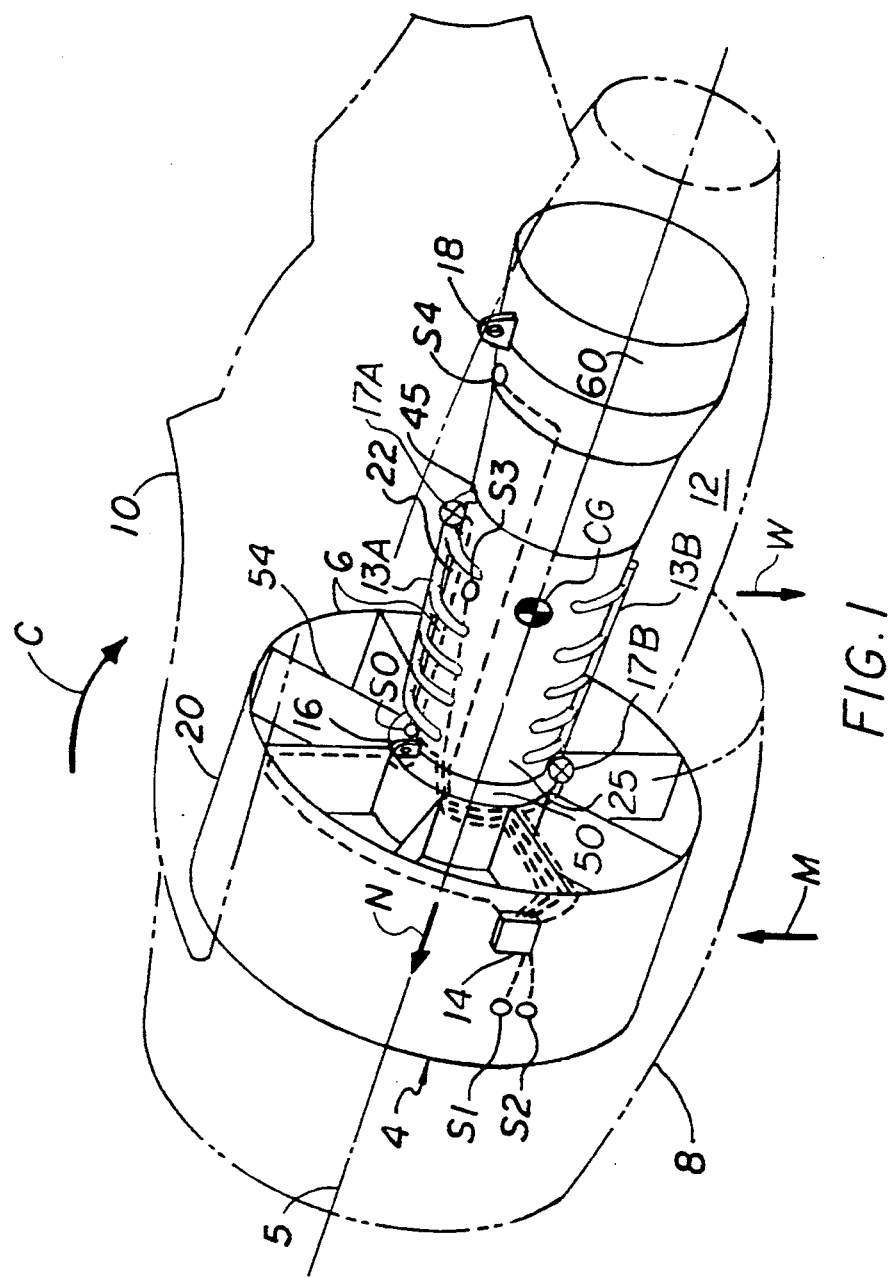
FIG. 1 is a schematic perspective view of a typical gas turbine engine including a backbone thermal control means for introducing a thermally controlled backbone counter-bending moment to the engine's backbone in accordance with the present invention.

Illustrated in FIG. 1 is an aircraft gas turbine engine 4, of the turbofan type, mounted within a nacelle 8 (shown by a phantomed line) and mounted to an aircraft (not shown) by mounting structure referred to as a pylon 10 (shown by a phantomed line) and employing the concepts of the present invention. The engine 4 is generally disposed about an undisturbed engine centerline 5 and has frame structure including a forward or fan frame 50 connected by a backbone 45, which is typically part of the engine casing 6, to an aft or turbine frame 60. The engine 4 is attached to the pylon 10, which typically extends downwardly from the aircraft wing, at a forward mounting means 16 on the fan frame 50 and at a rearward mounting means 18 on the turbine frame 60.

The engine is illustrated in the approximate attitude of level cruise and ground taxi conditions with the engine centerline 5 being substantially horizontal. As the aircraft leaves the runway and takes a climb condition attitude the centerline 5 becomes canted to the direction of approaching airflow and upward aerodynamic loading occurs on the nacelle 8. Aircraft maneuvers adds mass loading W acting essentially through the engine's center of gravity CG. As a result the aerodynamically induced loading M and/or maneuvering loads W, shown as directed radially outward and inward respectively at 180° from the top center but may be from other angular directions in a full range of 0°–360°, tends to pivot the engine in a clockwise direction C as illustrated, about the forward mounting means 16. The condition is particularly severe in engines with large diameter fan sections. Concurrently, thrust loads generated within the engine and acting along the engine's centerline 5 in the direction N further tend to cause the engine to pivot in the clockwise direction C as illustrated, about the forward mounting means. Rotation of the engine about the forward mount 16 is restrained by the rear mounting means 18 with the result that bending moments are induced and dissipated within the engine casing 6 and related structure and the casing is deflected from its undisturbed position which is generally concentric about the undisturbed engine centerline 5.

According to one embodiment of the present invention, a backbone thermal control means 12 (generally indicated at 12) for introducing a thermally controlled backbone counter-bending moment to the engine's backbone includes at least one, and preferably two, thermal airflow means to apply an uneven temperature field around the backbone. These are designated upper and lower thermal airflow means 13A and 13B. The portion of backbone in the present invention, which is subjected to the uneven temperature field is the engine casing 6, between a forward frame, preferably a fan frame 50, and an aft frame, preferably a turbine frame 60.

Figure 2:
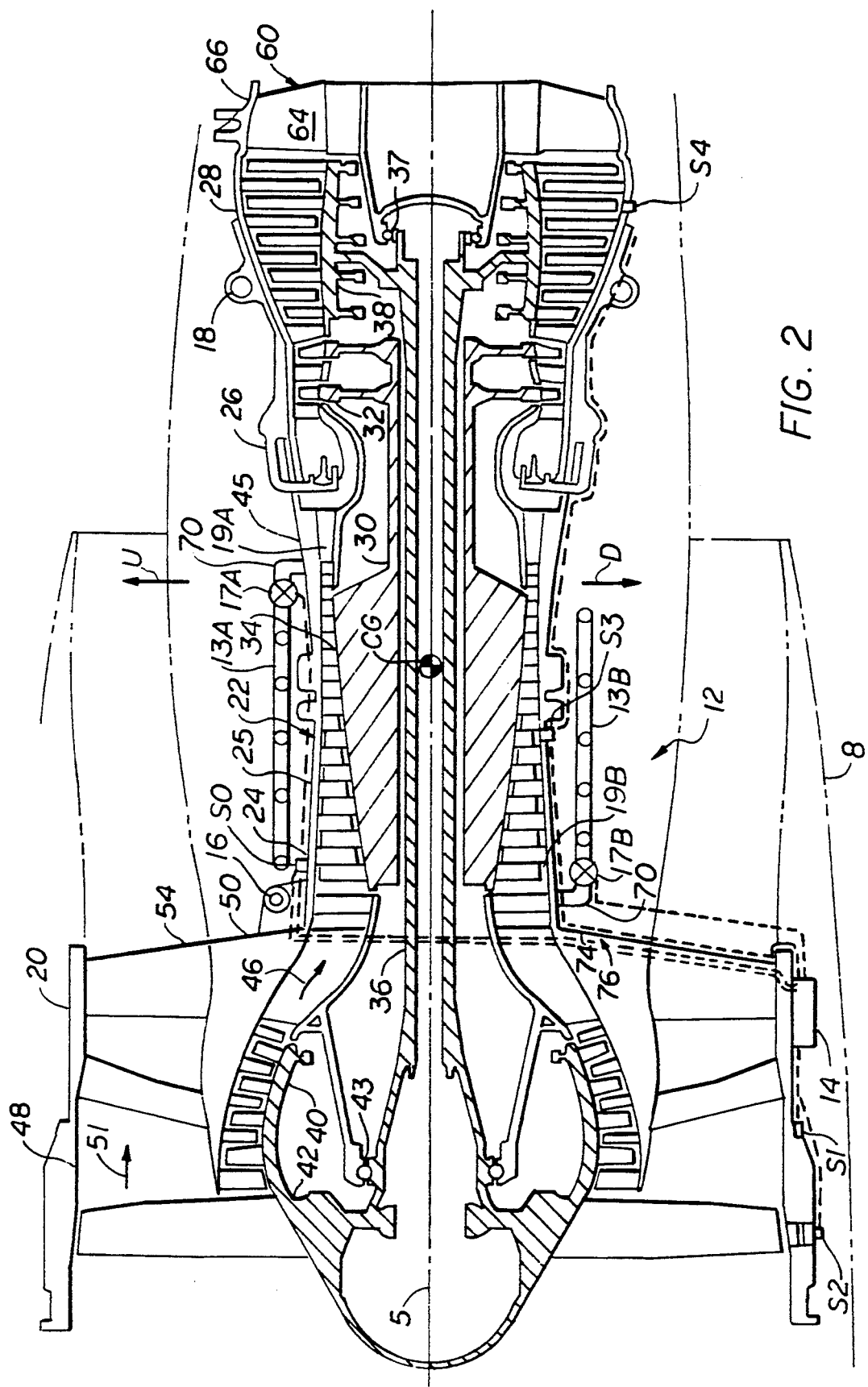
FIG. 2 is a schematic cross-sectional view of the gas turbine engine and the backbone thermal control means depicted in FIG. 1.

FIG. 2 illustrates in greater detail the engine 4 which is principally constructed with a fan section 20 and a core section 22 including a compression section 24, a combustion section 26 and a turbine section 28. The engine is of the two spool type having a high speed rotor 30 joining a high pressure turbine section 32 to a high pressure compression section 34 and a low speed rotor 36 joining a low pressure turbine section 38 to a booster compressor 40 and a fan stage 42. The low speed rotor 36 is supported axially and radially from the engine casing 6 by a forward thrust bearing 43 and radially by an aft rotor bearing 37. The high speed rotor 30 is disposed concentrically about the low speed rotor 36 by bearings not shown herein. The forward thrust bearing 43 is supported within a fan frame 50 that includes fan frame struts 54 that extend radially outward to a fan case 48 which is also part of the fan frame. The fan frame 50 is connected to a core engine casing or backbone 45 which circumscribes a core stream 46 of the engine 4 and a fan case 48 circumscribes a fan stream 51 of the engine. The aft rotor bearing 37 is supported within the turbine frame 60, which is connected to the backbone 45, that includes turbine frame struts 64 that extend radially outward to a turbine case 66, which is also considered part of the turbine frame.

Referring to FIGS. 1 and 2, the uneven temperature field provides a means for thermally shrinking or expanding an axially and circumferentially extending sector of the casing 6 between the frames 50 and 60 to provide tensioning and compressive forces which provides a resultant controlled backbone counter-bending moment. Further referring to FIG. 3, the axially extending portion of casing 6 is the compressor casing 25 of the compression section 24. The upper and lower thermal airflow means 13A and 13B flow thermally controlled air, which is either high temperature or low temperature air as compared to the temperature of the compressor casing 25, over a circumferentially extending sector designated by an inclusive sector angle B shown in FIG. 3. The sector angle B is preferably about 60° and is disposed at 30° in both the clockwise and counter-clockwise directions from a plane passing through the forward mounting means 16 and the rearward mounting means 18. This provides a good and economical degree of backbone deflection control over a wide range of the aircraft engine operating conditions.

The backbone thermal control means 12 is preferably controlled by a control means such as an engine control 14 and preferably a digital electronic control such as a FADEC (full authority digital electronic control) using input signals generated by conventional engine thrust load sensors S0 and/or inlet moment load sensors S1, and/or blade tip clearance sensors, such as a fan blade tip clearance sensor S2 or a compressor blade tip clearance sensor S3 or a turbine blade tip clearance sensor S4, as control parameters indicative of backbone bending. The engine control 14, using the input signals, can control both the amount and temperature of the thermal control airflow through the upper and lower thermal airflow means 13A and 13B by way of a hot airflow valve 17A and a cold airflow valve 17B. The hot airflow valve 17A is operable to bleed air from a relatively hot aft stage 19A of the compressor section 24. The cold airflow valve 17B is operable to bleed air from a relatively cool forward stage 19B of the compressor section 24. Though not specifically shown, the present invention also contemplates the use of mixing valves and associated plumbing to mix the two sources of thermal airflow to obtain a controlled temperature airflow, if so desired.

Figure 3:
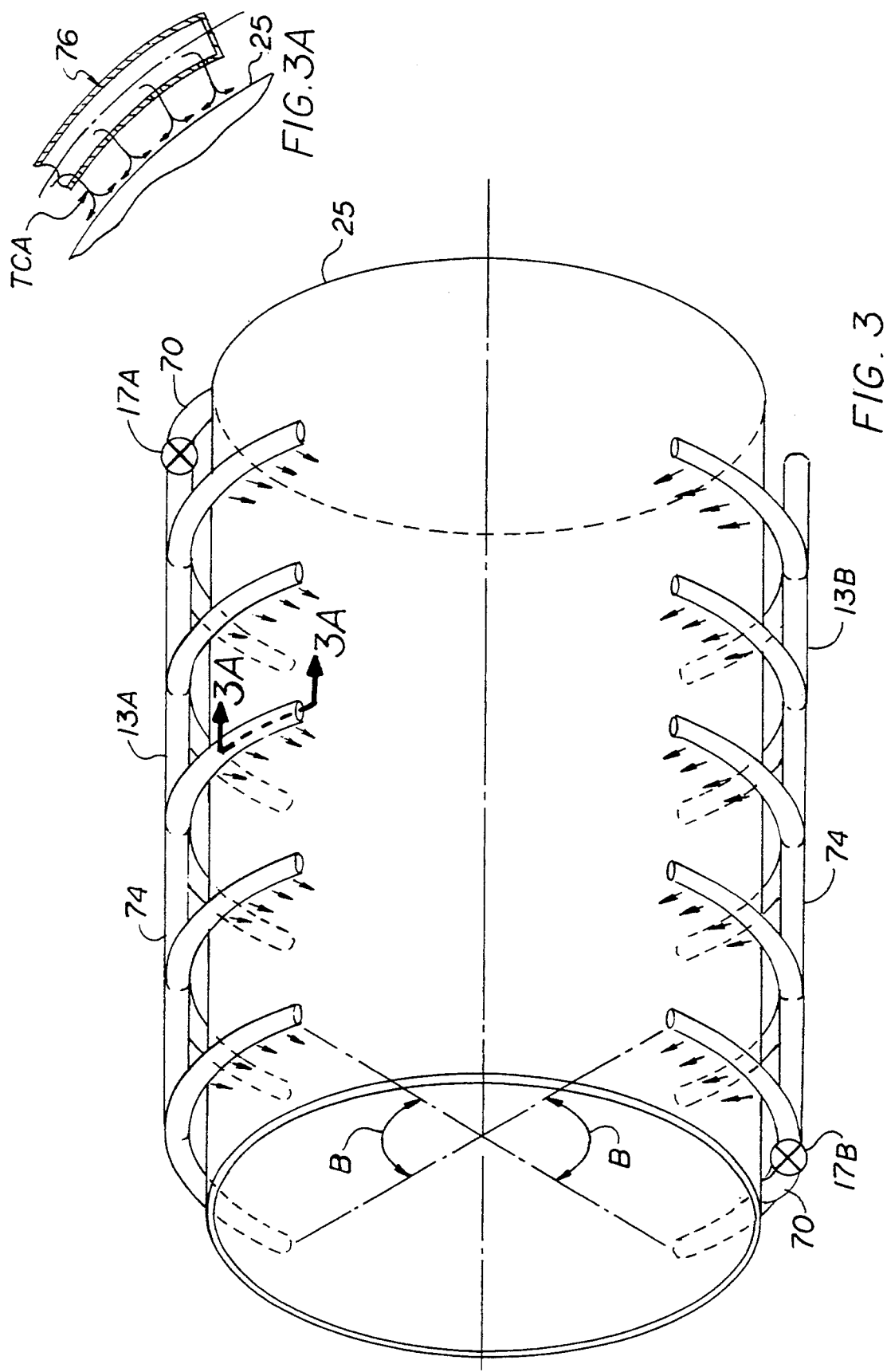
FIG. 3 is a schematic perspective view of a backbone thermal control means in accordance with one embodiment of the present invention.

Illustrated in FIG. 3, is one particular embodiment of the upper and lower thermal airflow means 13A and 13B. These thermal airflow means are operable to receive thermal control air, from plumbing illustrated by pipes 70 through the compressor casing 25, which is then admitted to axially extending manifolds 74 in a preferably controlled and regulated manner of the hot airflow valve 17A and the cold airflow valve 17B. Distribution tubes 76 extend circumferentially outward in both clockwise and counterclockwise directions from manifolds 74. The distribution tubes 76 are operably connected to the manifolds 74 to receive the thermal control air TCA and distribute it over the axially and circumferentially extending sector, designated by inclusive sector angle B, of the compressor casing 25. The thermal control air TCA is preferably radially impinged on the compressor casing 25 causing it to flow in a circumferential direction as indicated by arrows labelled TCA in FIG. 3A. Alternatively, the thermal control air TCA may be flowed parallel along the compressor casing 25 as illustrated in the embodiment in FIG. 4.

Typical loads encountered during takeoff by the engine cause the casing 6 to deflect in a downward direction D. To counter such deflections hot air is blown along engine casing 6 by the upper thermal airflow means 13A thus causing the upper sector of the engine casing 6 to expand and provide compressive forces. This results in a controlled backbone counter-bending moment and counter-deflection of the engine casing in the upward direction U. The lower thermal airflow means 13B may also be incorporated to flow relatively cold thermal control air along a lower sector of the engine casing to contract the lower sector and provide tension forces therein. This results in a controlled backbone counter-bending moment and counter-deflection of the engine casing in the upward direction U. More than two thermal airflow means may be used over a corresponding number of sectors of engine casing 6 to counter backbone deflections in directions other than just up or down.

It may be desirable to control three or more sectors using a like number of thermal airflow means in planes that are spaced at various angles from a plane passing through the forward mounting means 16 and the rearward mounting means 18 but other configurations are contemplated by the present invention including having only one at 180° which may give the most amount of performance for the lowest cost and weight associated with the invention.

Referring back to FIG. 2, control of the tensioning forces is provided by the digital electronic control 14 using input signals generated by engine thrust load sensors, inlet moment load sensors, and/or blade tip clearance sensors as control parameters as described above. The engine control 14 may employ control logic which uses one or more of alternative well known engine operating parameters including the speeds of the high speed rotor 30 or of the low speed rotor 36. Other well known engine operating parameters include the fan frame inlet load, moment, and engine thrust load. All of these parameters may be measured directly or indirectly, using strain gauges devices for example (not shown), with well known and conventional methods. The engine control 14 is operably connected to send a control signal to the upper and lower thermal airflow means 13A and 13B.

Figure 4:
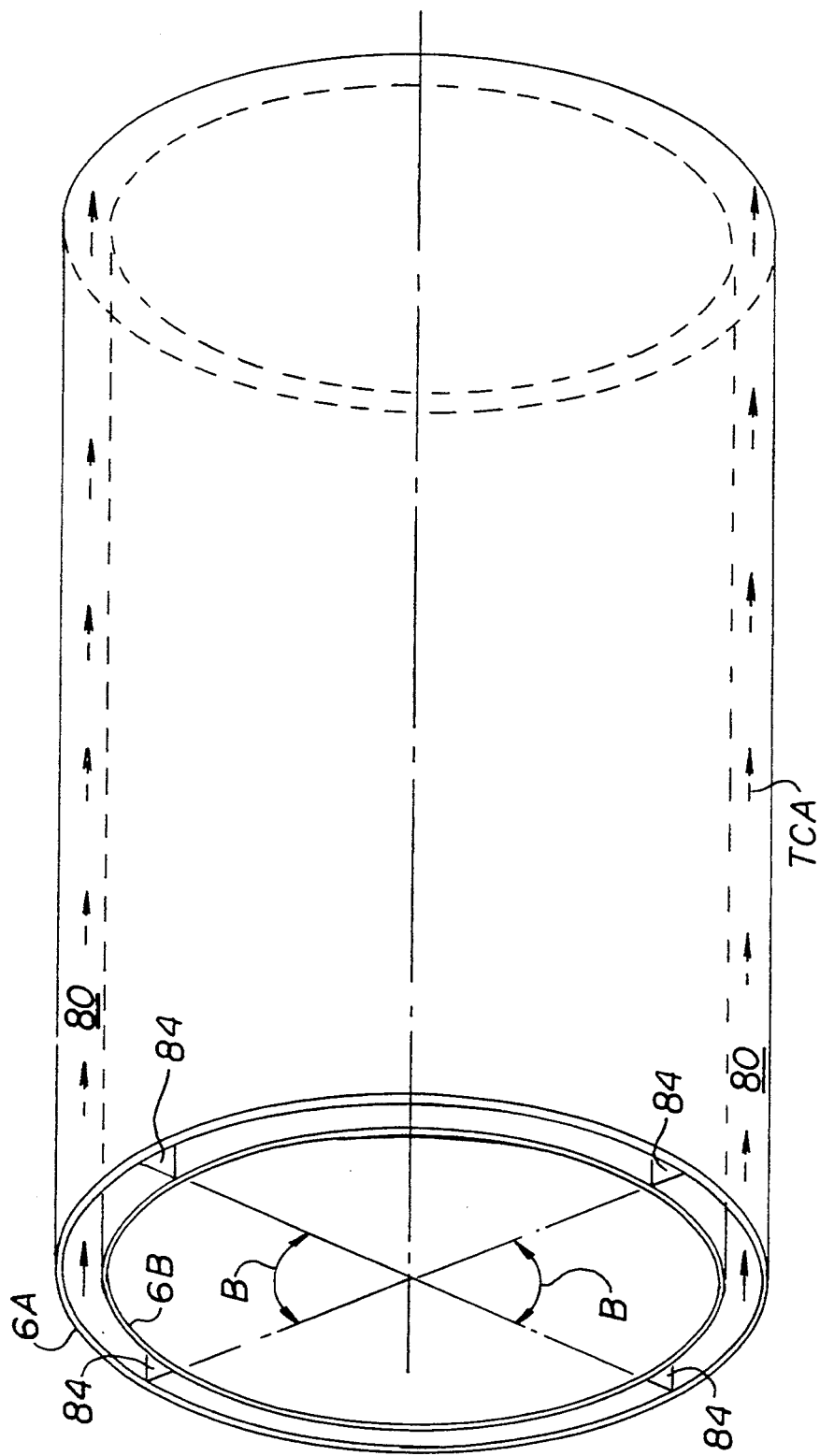
FIG. 4 is a schematic perspective view of a backbone thermal control means in accordance with another embodiment of the present invention.

Illustrated in FIG. 4 is an aircraft gas turbine-engine casing 6 forming at least in part a backbone of the engine similar to that in FIG. 3 but having inner and outer walls 6A and 6B respectively. Suitable thermal airflow means (not shown) supplies hot or cold thermal control air TCA to one or more sectored flowpaths 80, designated by inclusive sector angle B, between the inner and outer walls 6A and 6B. The sectored flowpaths 80 are used to provide the compressive and expansive forces in the inner and outer walls 6A and 6B and thus is the engine casing 6. The sectored flowpaths 80 are bounded in the circumferential clockwise and counter-clockwise directions by axially and radially extending bulkheads 84 disposed between the inner and outer walls 6A and 6B. The thermal airflow means is effective to flow the thermal control air TCA parallel along and between the inner and outer walls 6A and 6B. This provides a means to effect controlled backbone counter-bending moment and counter-deflection of the engine casing 6 in the upward direction U or the downward direction D as so desired in a manner similar to that described above. The inner and outer walls 6A and 6B which form the engine casing 6 of the backbone operate essentially in tandem to counter backbone deflections and may be arranged to do so in directions other than just up or down.

While the preferred embodiment of our invention has been described fully in order to explain its principles, it is understood that various modifications or alterations may be made to the preferred embodiment without departing from the scope of the invention as set forth in the appended claims.

We claim:

1. In an aircraft gas turbine engine having an annular backbone disposed between and structurally connecting a forward and an aft annular frame wherein said backbone experiences deflection during takeoff loading, a method of controlling said backbone deflection comprising the steps of:

applying backbone temperature control air to said backbone to establish a circumferentially uneven temperature distribution around at least an axially extending portion of said backbone for generating thermal deflection forces countering said takeoff induced deflection, and controlling the application of said backbone temperature control air for controlling said thermally induced counter-deflection forces.

2. The method of claim 1 further including the step of flowing thermal control air onto a circumferentially extending sector of said portion of said backbone.

3. The method of claim 2 wherein said portion of said backbone comprises at least part of an engine casing and said method further includes the step of flowing said backbone temperature control air over said at least part of said engine casing.

4. The method of claim 3 further including the steps of:

sensing at least one signal from said engine indicative of backbone bending and controlling the application of said backbone temperature control air in response to said backbone bending signal.

5. The method of claim 4 further including the steps of:

sensing a plurality of engine signals indicative of backbone bending said sensed signals being selected from the group comprising:

engine inlet moment load signal, engine thrust load signal, and engine blade tip clearance signal from said engine and controlling the application of said backbone temperature control air in response to said plurality of backbone bending signals.

6. The method of claim 3 further including the step:

providing a plurality of thermal airflow ports located along the upper sector of said casing, providing a relatively hot thermal control airflow source, and providing suitable plumbing operable to route said hot thermal control airflow source to each of said plurality of thermal airflow ports located along the upper sector of said casing causing said casing to expand to provide compressive forces resulting in the counter-deflection of said casing in an upward direction.

7. The method of claim 14 further including the steps:

providing a plurality of thermal airflow ports along a lower sector of said casing, providing a source of relatively cold thermal control airflow, and routing said cold thermal control airflow from said source to each of said plurality of thermal airflow ports along the lower sector of said casing for causing said casing to contract and establishing tensile forces resulting in the counter-deflection of said casing in an upward direction.

8. The method of claim 7 wherein said step of providing said plurality of said thermal airflow ports located along the upper sector of said casing, includes providing thermal airflow ports operable to direct thermal control air in a direction radial to and along said casing.

9. The method of claim 8 wherein;

said casing comprises an inner annular wall spaced radially inward of an outer annular wall, and wherein said step of providing said thermal airflow ports further comprises providing circumferentially extending sectored flowpaths between said walls including circumferentially spaced apart bulkheads radially extending between said inner and outer annular walls, and wherein said step of providing said thermal control means further comprises providing said thermal airflow ports to direct thermal control air between said annular walls in a direction parallel to and along said casing.

10. The method of claim 9 wherein said method further includes the steps of operably connecting said engine control to at least one sensor operable to generate at least one control input signal for said engine control wherein said input signal is generally indicative of backbone bending.

11. The method of claim 10 wherein said step of providing said input backbone bending indicative signals, includes the step of selecting said input signal from backbone bending signals including signals that measure inlet moment load, engine thrust load, and blade tip clearances.

12. The method of claim 11 wherein said forward and aft frames comprise a fan frame and a turbine frame respectively.

13. The method of claim 12 wherein said control means is an aircraft gas turbine engine electronic control.

14. The method of claim 1 wherein said takeoff induced backbone loading produces downward deflection of said backbone and said thermally induced counter deflection force produces upward deflection of said backbone.

* * * * *